United States Patent

Reeves

Patent Number: 5,912,369
Date of Patent: Jun. 15, 1999

[54] SELF-ADHESIVE AIR FILTER

[76] Inventor: Malcolm C. Reeves, P.O. Box 1256, Alameda, Calif. 94501-0301

[21] Appl. No.: 09/087,319

[22] Filed: May 29, 1998

Related U.S. Application Data

[63] Continuation-in-part of application No. 08/858,055, May 16, 1997, abandoned.

[51] Int. Cl.$^6$ ............................................. B01D 46/02
[52] U.S. Cl. ........................ 55/385.1; 55/385.6; 55/527; 55/528; 55/DIG. 35
[58] Field of Search ............................. 55/385.1, 385.6, 55/527, 528, DIG. 35, 485; 264/518; 428/171

[56] References Cited

U.S. PATENT DOCUMENTS

| | | | |
|---|---|---|---|
| 4,134,948 | 1/1979 | Baker, Jr. | 264/518 |
| 4,207,367 | 6/1980 | Baker, Jr. | 428/171 |
| 4,304,230 | 12/1981 | Seufert | 55/DIG. 35 |
| 4,889,542 | 12/1989 | Hayes | 55/385.6 |
| 4,904,343 | 2/1990 | Giglia et al. | 55/527 |
| 5,490,336 | 2/1996 | Smick et al. | 55/385.1 |
| 5,607,647 | 3/1997 | Kinkead | 55/485 |
| 5,626,820 | 5/1997 | Kinkead et al. | 55/485 |

*Primary Examiner*—Jay H. Woo
*Assistant Examiner*—Minh-Chau T. Pham
*Attorney, Agent, or Firm*—Malcolm B. Wittenberg

[57] ABSTRACT

Self-adhesive fibrous air filters that are universally compatible with devices that require filtered air and devices that provide filtered air. The self-adhesive air filters are fabricated from a flexible fibrous air filter blank composed of, for example, polyester batting, that is coated with an air permeable non-drying adhesive that has been vacuumed into the interstices of the fibers. A template serves as a protective cover for the non-drying adhesive and enables a user to shape and/or size the blank to configurations that are compatible with the air intake regions of the devices on which the self-adhesive air filters are to be installed.

14 Claims, 2 Drawing Sheets

SELF-ADHESIVE AIR FILTER

This application is a Continuation-In-Part (CIP) of application Ser. No. 08/858,055, filed on May 16, 1997, now abandoned.

FIELD OF THE INVENTION

The present invention relates to air filters. More particularly, the present invention relates to a self-adhesive air filter for securable attachment to the air intake region of any device.

BACKGROUND OF THE INVENTION

A conventional air filter is typically mounted in a filter housing which, in turn, is typically mounted in a device which draws or pushes air through the air filter and filter housing. There are some devices, coming in various shapes and sizes, that require filtered air to protect internal components from abrasion and/or corrosion due to the intake of foreign particles. For example, computers, VCRs, stereos, and TVs require filtered air to protect internal components. There are other devices, also coming in various shapes and sizes, that can be used to provide filtered air by removing unwanted particles from the surrounding environment. For example, box fans, circular fans, air purifiers, and central heating air-conditioning systems can be used to provide filtered air in a home environment. As a result, there are a variety of air filters and air filter housings on the market that are custom made to be compatible with particular devices. For example, there are custom filters and filter housings which are compatible with air purifiers but are not compatible with computers. As can readily be appreciated, the purchase of custom made replacement filters and filter housings for each particular device can quickly become very expensive. Furthermore, it sometimes costs nearly as much to purchase the replacement filters and filter housings as it did to purchase the original device. Consequently, there is a continuing need for a universal air filter that is compatible with the various devices that require and/or provide filtered air.

Another drawback encountered with conventional air filters is the necessity of having air filter housings for supporting and properly positioning the air filters on a device. As can readily be appreciated, the mere presence of an air filter housing often increases the size of the overall device. This, in turn, increases the overall cost of the device. Furthermore, it is often difficult to manipulate the air filter housing to remove a spent air filter and replace it with a new air filter. Accordingly, users of devices that provide filtered air often fail to replace the spent air filters thereby thwarting the very reason for operating the air filtering devices. Additionally, users of devices that require filtered air often fail to replace the spent air filters thereby shortening the service life of the devices due to the corrosion or abrasion of the internal components within the devices. Furthermore, air filter housings often impede the flow of air through the air filters thereby reducing the effectiveness of the air filters. Consequently, there is a continuing need for a universal air filter that can be positioned in various air ingesting or expelling devices without using an air filter housing.

There is currently no self-adhesive air filter which is available that will secure itself to any dry surface that it is in contact with. It is oftentimes desirable to adhere a filter to such diverse surfaces as screens, grills and slotted air openings which not only present the challenge of having non-contiguous surfaces for filter application but also which may be of odd and unpredictable surface geometries.

As noted above, most commonly available filters are those which are confined within a casing made of material which is not intended to assist in the filtering function but simply intended to physically house and retain the filter in a given location. As such, casings made of, for example, cardboard and plastic limit the application of filter materials to unanticipated and geometrically complex surfaces. Even if a manufacturer was to offer a line of filters for every conceivable application, filter distributors would have to inventory an unrealistically large number of products to complete their filter line inventory.

Perhaps the closest design to the present invention, at least specifically, is shown in U.S. Pat. No. 5,490,336 to Smick et al. This Feb. 13, 1996 patent describes a filter design for appliances having electric motors such as hair dryers, power tools and drills. Smick et al. also discloses that their filter can be cut to fit onto the intake portion of such an appliance. However, the filter employs a foam material that has an asterisk shaped piece or pieces of plastic that are either pressed, compressed or molded into the foam filter material. This asterisk shaped add-on component retains adhesive. However, the plastic adhesive bearing strips, by their very nature, resists conforming to a complex geometric surface. In addition, when Smick et al. teaches cutting their filter to provide a cone-shaped object, some of the cutting inherently requires the removal of the asterisk-shaped plastic and related adhesive such that if the filter is cut as to remove the asterisk at a border of a cut region, there will be no adhesive at the margin of the filter to retain it onto the motor intake surface thus removing the effectiveness of the filter for all practical purposes. Finally, it should be appreciated that the plastic asterisk adhesive pattern does nothing but block portions of the filter resulting in a reduction in overall filter surface area.

While there are several prior art filters, each prior art filter suffers from the drawbacks discussed above. For example, U.S. Pat. No. 5,433,764 to Matschke, issued Jul. 18, 1995, describes a circular filter held by a retainer of porous material. A layer of adhesive is positioned on the retainer to hold it and the filter on a device. However, so much adhesive is used that it virtually blocks the porosity of the filter.

U.S. Pat. No. 5,331,748 to Miller, Jr., issued Jul. 26, 1994, describes a circular filter having three spaced strips of polyester on one side of the filter. The outer surfaces of the strips are coated with an adhesive for holding the filter on the intake portion of a blow dryer. Miller, Jr., like Smick et al., teaches using adhesive strips on a limited portion of the filter since the adhesive strips reduce the effectiveness of the filter by impeding the flow of air through the filter.

U.S. Pat. No. 5,370,721 to Carnahan, issued Dec. 6, 1994, describes a ceiling fan filter for filtering the air in a room having a ceiling fan. As can readily be appreciated upon reviewing Carnahan, the filter disclosed is custom made for a ceiling fan and is not compatible with other devices for filtering air.

It is an object of the present invention to provide a self-adhesive air filter which overcomes the drawbacks of the prior art.

It is another object of the present invention to provide a self-adhesive air filter which is universally compatible with devices that require filtered air.

It is yet another object of the present invention to provide a self-adhesive air filter which is universally compatible with devices that provide filtered air.

It is a further object of the present invention to provide a self-adhesive air filter which can be positioned in various air ingesting and/or expelling devices without using an air filter housing.

It is yet a further object of the present invention to provide a self-adhesive air filter which is self adhesive without reducing the effectiveness of the filter.

These and other objects of the present invention will become apparent to one skilled in the art in view of the figures and description of the figures given below.

SUMMARY OF THE INVENTION

Briefly stated, self-adhesive air filters are provided that are universally compatible with devices that require filtered air and devices that provide filtered air. The self-adhesive air filters are fabricated from a fibrous air filter blank that is coated with an air permeable non-drying adhesive. A template serves as a protective cover for the non-drying adhesive and enables a user to shape and/or size the blank to configurations that are compatible with the air intake regions of the devices on which the self-adhesive air filters are to be installed.

A feature of the invention includes a self-adhesive air filter for installing over the air intake region of a device, the self-adhesive air filter including a fibrous air filter member having at least one face, at least one layer of air-permeable adhesive coating the face in its entirety, and a protective layer lightly adhering to the layer of air-permeable adhesive to permit removal of the protective layer prior to installing the air filter member over the air intake region of the device.

Another feature of the invention includes a method of installing a self-adhesive air filter over the air intake region of a device, the method includes providing a rectangular blank of fibrous air filter material having an air-permeable adhesive on an upper surface thereof and having a template lightly adhering to the air-permeable adhesive, altering the rectangular blank into a shape that is compatible with the air intake region of the device by cutting the blank along one of a plurality of geometric patterns provided on the template, removing the template from the altered blank, placing the upper surface of the altered blank against the air intake region of the device such that the upper surface is aligned with the air intake region, and applying a pressure to a lower surface of the altered blank whereby the altered blank adheres to the air intake region of the device.

DETAILED DESCRIPTION OF THE PREFERRED EMBODIMENTS

Figure 1:
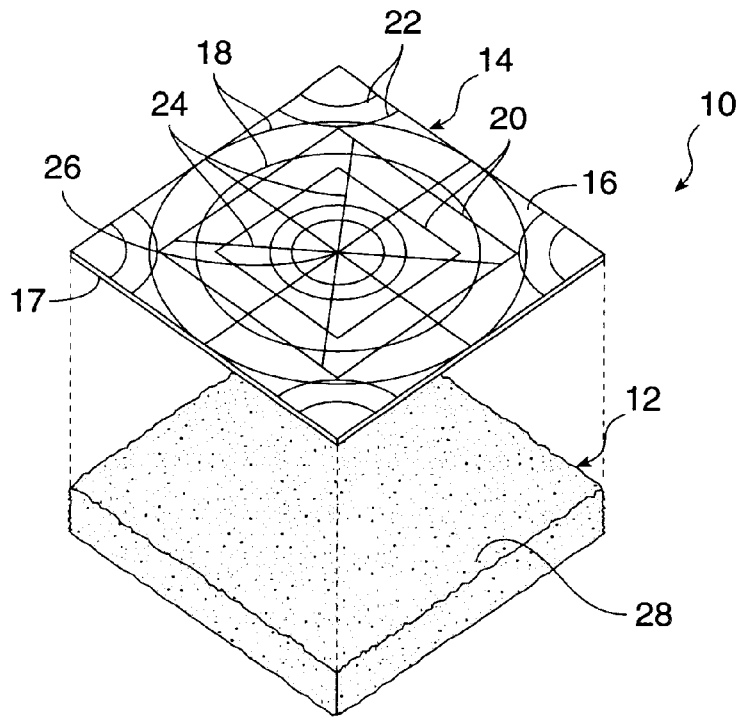
FIG. 1 is an exploded view of a adhesive filter material blank and an associated template for cutting the blank to a size and/or shape to fit the blank to a particular device.

Referring to FIG. 1, a filter forming assembly 10 of the present invention is shown. The filter forming assembly 10 includes a square blank 12 of adhesive fibrous filter material and a template 14 for cutting the adhesive filter material. The template 14 is used to enable a user to shape and/or size the blank 12 to a configuration that is compatible with the air intake region of a device on which the self-adhesive air filter will be installed.

The fibrous blank 12 is an air filter material that has been treated with a non-drying adhesive. The preferred air filter material is composed of conventional fibrous polyester batting that can be treated with a non-drying adhesive. While the air filter material is preferably one quarter of an inch thick, the selection of the thickness would, of course, depend on the filter's intended use. However, a feature of this invention is to use a fibrous filter material that is flexible and easily conformable to complex geometric shapes—an attribute that is not shared by the filter of Smick et al. due to their use of plastic adhesive bearing strips.

The preferred adhesive is a non-drying adhesive such as Duro's All Purpose Spray Adhesive composed of n-hexane, dimethyl ether and acetone. However other non-drying adhesives can be used as long as the adhesive, once applied, would not be readily combustible. The adhesive offers minimal air flow resistance and releasably secures the air filter material on the air intake region of an underlying device. The adhesive also enhances the effectiveness of the air filter material by trapping minute particles not otherwise trapped by the air filter material. When the air filter material is spent the adhesive permits the air fiter material to be removed from the air intake region of an underlying device without excessive debris being left on the air intake region.

The template 14 is a flexible piece of material such as protective plastic, acetate film, or wax paper. Printed or otherwise provided on a first side 16 of the template 14 is a set of circles 18, a set of rectangular polygons 20, a set of arcuate lines 22, and a set of perpendicular lines 24. The sets of geometric FIGS. 18, 20, 22 and 24 are centered around a center 26 of the template 14. The sets of geometric FIGS. 18, 20, 22 and 24 enable a user to shape and/or size the blank 12 to a configuration that is compatible with the air intake region of the device on which the self-adhesive air filter will be installed.

During manufacturing of the filter forming assembly 10, a first uniform coating of the non-drying adhesive is preferably sprayed onto a surface 28 of the blank 12 and vacuumed into the fibers of the air filter material of the blank 12. A second coating of non-drying adhesive is then applied to the surface 28 of the blank 12. Additional coats of non-drying adhesive can be applied depending on the air filter's intended use. A second side 17 of the template 14 is then positioned on the adhesive surface 28 of the blank 12 so the template 14 covers and protects the adhesive surface 28 of the blank 12. It was found that the adhesive alone contributes approximately 10 to 15% or more of the actual filtering function of the present invention particularly noting that this invention contemplates the use of a uniform application of adhesive over the entire surface of the fibrous batting.

Figure 2:
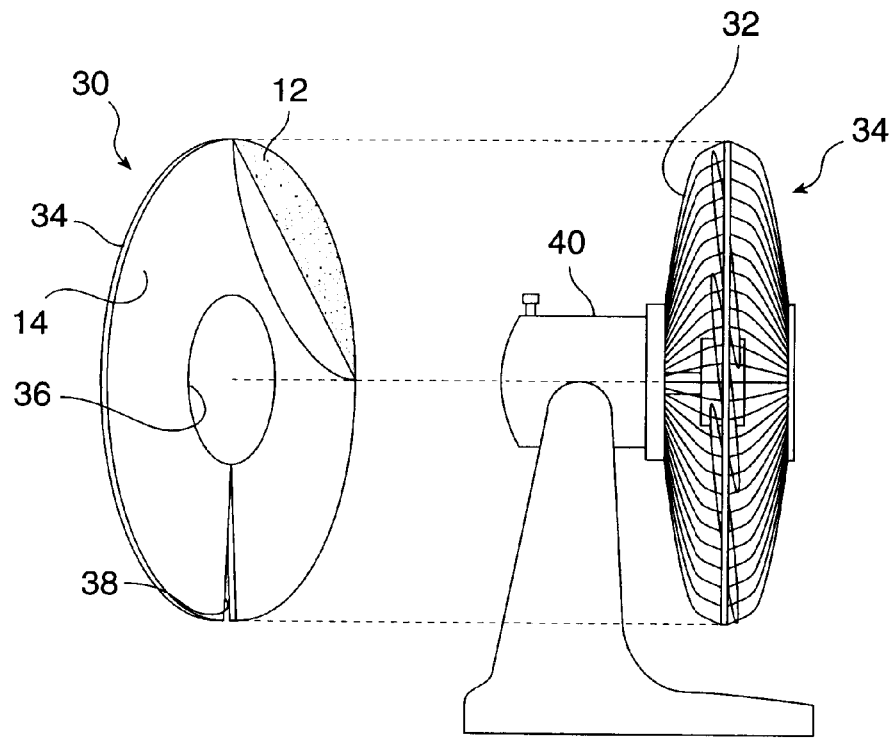
FIG. 2 is an exploded view showing a filter cut from the blank of FIG. 1 for installation on a circular fan.

Referring now to FIG. 2, a self-adhesive air filter 30, cut from the filter-forming assembly 10 of FIG. 1, is shown. The self-adhesive air filter 30 is formed to fit a back side 32 of a circular fan 34. The air filter 30 is formed by first cutting the blank 12 and template 14 along two circles 34 and 36 provided in the set of circles 18 on the template 14. Then a slit 38 is cut along a portion of one line provided in the set of perpendicular lines 24 on the template 14 to give the self-adhesive air filter 30 a split annular configuration. Afterwards, the template 14 is peeled away from the self-adhesive air filter 30. The adhesive surface 28 of the self-adhesive air filter 30 is then mounted on the back side 32 of the circular fan 34 by spreading the self-adhesive air filter 30 apart at the slit 38, sliding the air filter 30 over the fan motor housing 40, rotating the air filter 30 until the slit 38 points radially upward away from the fan motor housing 40, and firmly pressing the filter 30 against the back side 32 of the circular fan 34.

Figure 3:
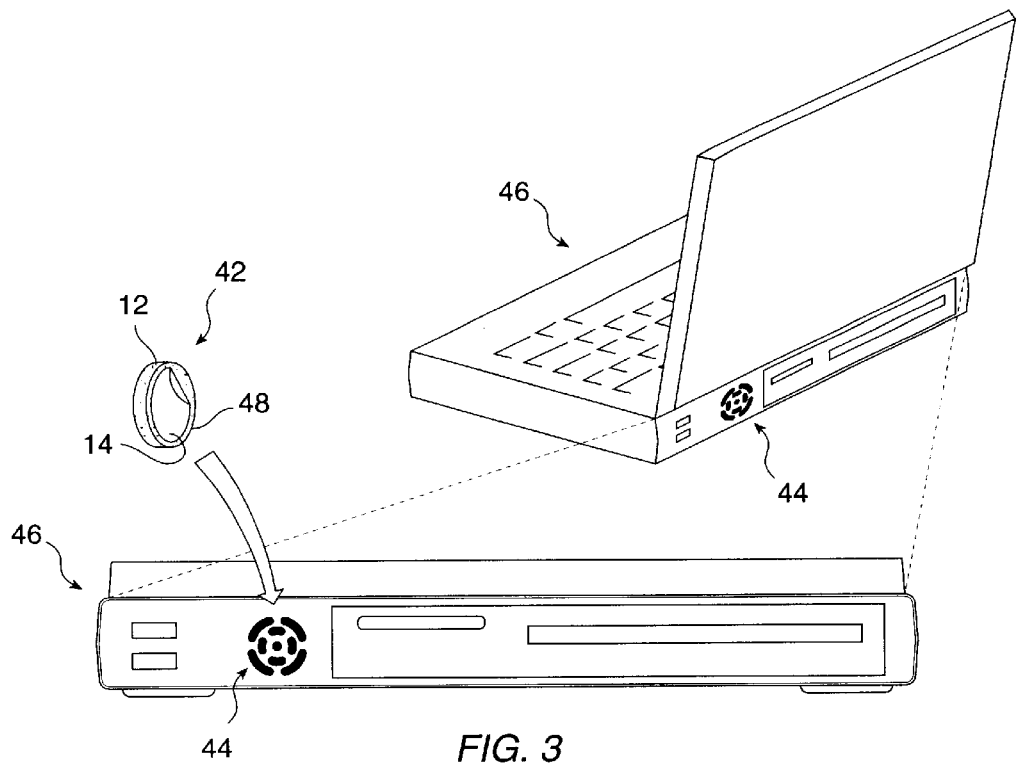
FIG. 3 is an exploded view showing a filter cut from the blank of FIG. 1 for installation over an air intake vent of a lap top computer.

Referring now to FIG. 3, another embodiment of a self-adhesive filter 42, cut from the filter forming assembly 10 of FIG. 1, is shown. The self-adhesive air filter 42 is formed to fit an air intake vent 44 of a lap top computer 46. The self-adhesive air filter 42 is formed by cutting the blank 12 and template 14 along a circle 48 provided in the set of circles 18 on the template 14. Afterwards, the template 14 is peeled away from the self-adhesive air filter 42. The self-adhesive air filter 42 is then mounted on the air intake vent 44 by placing the adhesive surface 28 of the self-adhesive air filter 42 against the air intake vent 44 and firmly pressing the self-adhesive air filter 42 against the air intake vent 44 of the lap top computer 46.

Figure 4:
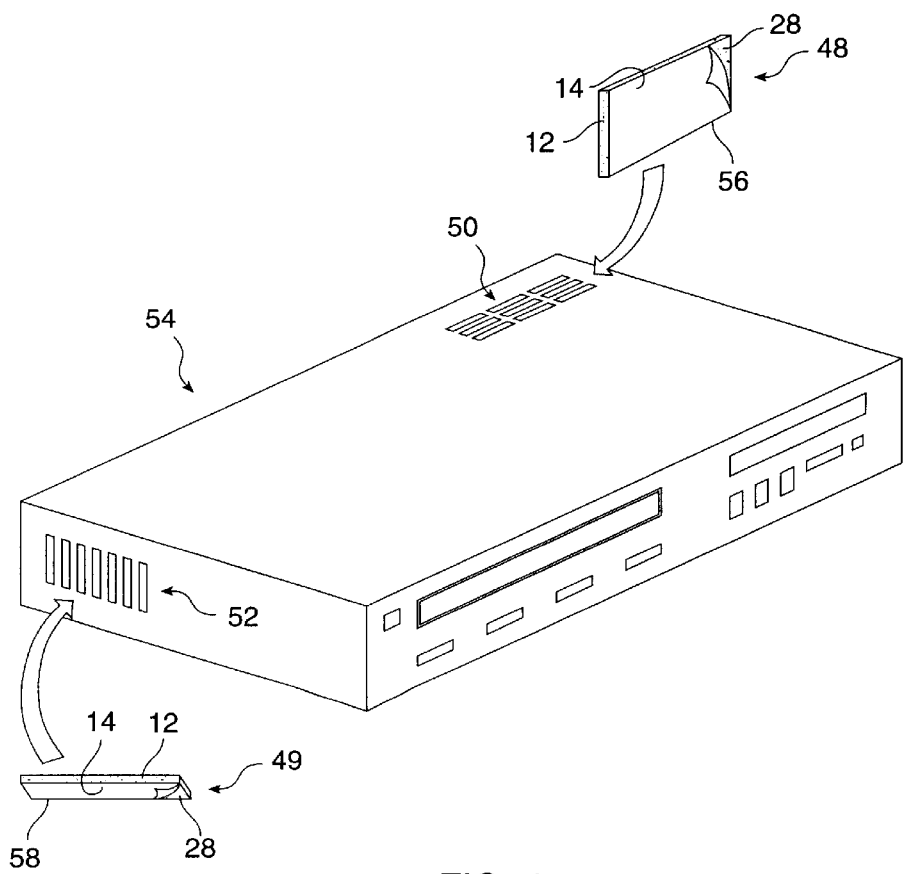
FIG. 4 is an exploded view showing a pair of filters cut from the blank of FIG. 1 for installation over the heat vents of a stereo system.

Referring now to FIG. 4, two more embodiments of self-adhesive air filters 48 and 49, cut from the filter forming assembly 10 of FIG. 1, are shown. The self-adhesive air filters 48 and 49 are formed to fit the heat vents 50 and 52 of a stereo system 54. The self-adhesive air filters 48 and 49 are formed by cutting the blank 12 and template 14 along two rectangles 56 and 58 provided in the set of rectangular polygons 20 on the template 14. Afterwards, the template 14 is peeled away from each self-adhesive air filter 48 and 49. The self-adhesive air filters 48 and 49 are then mounted on the heat vents 50 and 52 by placing the adhesive side 28 of each self-adhesive air-filter 48 and 49 on the respective heat vents 50 and 52 and firmly pressing each self-adhesive air filter 48 and 49 against the stereo system 54.

The present invention is remarkable in its simplicity, particularly as compared to the prior art. Superficially, Smick et al. in U.S. Pat. No. 5,490,336 seems to suggest an air filter similar to that proposed herein but the differences, as noted above, are remarkable. Smick et al.'s design is limited to a foam material employing plastic strips within the foam in order to adhere the foam to a receiving surface. Unlike the present invention in which adhesive is globally applied uniformly to a surface of fibrous batting, Smick et al. are unable to apply adhesive to their foam filter material for the adhesive would cause pores of the foam to clog and, in extreme cases, to melt. Smick et al. employ plastic strips to not only prevent this from occurring but because the adhesive-type caulking that Smick et al. employ would not adhere strongly enough to the foam filter material and, as a consequence, when removing the foam filter from its receiving surface, the adhesive would remain on the appliance causing an unsightly and generally unacceptable appearance.

The present invention is remarkable in its effectiveness and simplicity. A fibrous batting material such as a sheet of one-quarter inch polyester is sprayed uniformly with an adhesive which is vacuumed into the fibrous interstices of the filter material. A second light coating of adhesive is preferably then applied to the filter material and together, these adhesives not only act to removably retain the filter material onto a receiving surface but enhance the filtering characteristics of the fibrous batting to a point where the batting acts as a filter far superior to that demonstrated without the adhesive. In addition, the fibrous batting, being quite flexible, can readily adhere to any complex geometry while the filter can be cut to complex shapes with the reassurance that the filter material which remains after cutting continues to possess the necessary adhesive layer to ensure adhesion between the filter material and its receiving surface. By contrast, prior devices have resorted to the use of complex filtering materials, adhesive patterns and filter housings in an attempt to construct filters which simply don't compare to the filtering ability and flexibility of use enjoyed by the present invention.

A general description of the device and method of using the present invention, as well as the preferred embodiments of the present invention, has been set forth above. One skilled in the art will recognize and be able to practice many changes in many aspects of the device and method described above, including variations which fall within the teachings of the present invention. The spirit and scope of the invention should be limited only as set forth in the claims which follow.

What is claimed:

1. A self-adhesive air filter for installing over the air intake region of a device, said self-adhesive air filter consisting essentially of:
    a fibrous air filter member having at least one face;
    at least one layer of air-permeable non-drying adhesive coating said at least one entire face of said air filter member; and
    a protective layer lightly adhering to said at least one layer of air-permeable adhesive to permit removal of said protective layer prior to installing said air filter member over said air intake region of said device.

2. The self-adhesive air filter of claim 1 wherein said at least one layer of air-permeable adhesive coating extends from said at least one face of said air filter member by vacuuming said adhesive into an interior portion of said air filter member.

3. The self-adhesive air filter of claim 2 wherein said at least a second layer of air-permeable adhesive resides over said at least one layer.

4. The self-adhesive air filter of claim 2 wherein said at least one layer of air-permeable adhesive captures a plurality of minute foreign particles from the surrounding air not otherwise captured by said air filter member.

5. The self-adhesive air filter of claim 1 wherein said protective layer is a patterned template that permits a user to modify said air filter member such that said air filter member is compatible with the air intake regions of a plurality of devices.

6. The self-adhesive air filter of claim 5 wherein said patterned template contains a plurality of geometric configurations.

7. The self-adhesive air filter of claim 1 wherein said fibrous air filter member comprises a sheet of polyester batting.

8. The self-adhesive air filter of claim 7 wherein said sheet of polyester batting is approximately ¼" in thickness.

9. The self-adhesive air filter of claim 2 wherein said at least one layer of air-permeable adhesive is a non-drying adhesive.

10. The self-adhesive air filter of claim 2 wherein said protective layer is a patterned template that permits a user to modify said air filter member such that said air filter member is compatible with the air intake regions of a plurality of devices.

11. The self-adhesive air filter of claim 10 wherein said patterned template contains a plurality of geometric configurations.

12. A method of installing a self-adhesive air filter over the air intake region of a device, the method consisting essentially of:

provising a blank of a fibrous air filter material having an air-permeable adhesive on an entire upper surface thereof and having a sheet material lightly adhering to said air-permeable adhesive;

altering said blank into a shape that is compatible with said air intake region of said device by cutting said blank and sheet material;

removing said sheet material from said altered blank;

placing said upper surface of said altered blank against said air intake region of said device such that said upper surface is aligned with said air intake region; and applying a pressure to a lower surface of said altered blank whereby said altered blank adheres to said air intake region of said device.

13. The method of claim 12 wherein said blank of air filter material is configured into a rectangular shape.

14. The method of claim 13 wherein said sheet material is a template having a plurality of geometric patterns provided thereon.

* * * * *